(12) United States Patent
Jha

(10) Patent No.: US 6,954,891 B1
(45) Date of Patent: Oct. 11, 2005

(54) TECHNIQUE FOR PAYLOAD-INDEPENDENT FRAME DELINEATION ENGINE FOR OPTICAL DATA TRANSPORT

(75) Inventor: Pankaj K. Jha, Fremont, CA (US)

(73) Assignee: Cypress Semiconductor Corp., San Jose, CA (US)

(*) Notice: Subject to any disclaimer, the term of this patent is extended or adjusted under 35 U.S.C. 154(b) by 253 days.

(21) Appl. No.: 10/017,528

(22) Filed: Dec. 7, 2001

Related U.S. Application Data

(60) Provisional application No. 60/351,639, filed on Oct. 29, 2001.

(51) Int. Cl.[7] .............................................. H03M 13/00
(52) U.S. Cl. ........................ 714/776; 714/774; 714/779
(58) Field of Search ................................ 714/776, 774, 714/779

(56) References Cited

U.S. PATENT DOCUMENTS

| | | | | |
|---|---|---|---|---|
| 5,550,847 A | * | 8/1996 | Zhu ........................... | 714/748 |
| 6,445,717 B1 | * | 9/2002 | Gibson et al. .............. | 370/473 |
| 6,477,669 B1 | * | 11/2002 | Agarwal et al. ............ | 714/708 |
| 6,522,665 B1 | * | 2/2003 | Suzuki et al. ............... | 370/471 |

FOREIGN PATENT DOCUMENTS

EP            942569 A2 *  9/1999  ........... H04L 29/06

OTHER PUBLICATIONS

Pankaj K. Jha, Internet Draft "Payload-Independent Delineation for Simple Data Link (SDL) Framing", Cypress Semiconductor Corp., Nov., 2001, pp. 1-7.

J. Carlson et al., Network Working Group "PPP Over Simple Data Link (SDL) Using SONET/SDH with ATM-Like Framing", May, 2000, pp. 1-26.

J. Carlson et al., PPP Working Group "PPP Over Simple Data Link (SDL) Using SONET/SDH with ATM-Like Framing", Sep. 1999, pp. 1-26.

Paul Langer, et al., "Data Over Fiber", Lucent Technologies, pp. 1-6.

American National Standard for Telecommunications, "Generic Framing Procedure", pp. 1-42.

Pankaj K. Jha, Data Networking Group "A Hybrid Data Transport Protocol for Optical Networks", Cypress Semiconductor Corp., Nov. 2000, pp. 1-70.

* cited by examiner

*Primary Examiner*—Joseph D. Torres
(74) *Attorney, Agent, or Firm*—Christopher P. Maiorana, PC

(57) ABSTRACT

A method for delineating a frame. The method generally comprises the steps of (A) receiving the frame comprising (i) a length value incorporating a payload error detection length, (ii) a length error detection value, (iii) a payload data, and (iv) a payload error detection value having the payload error detection length, wherein the payload error detection value and the payload data occupy separate fields of the frame, (B) performing an error detection on the length value based upon the length error detection value, and (C) retrieving the payload data and the payload error detection value based upon the length value in response to passing the error detection on the length value.

13 Claims, 6 Drawing Sheets

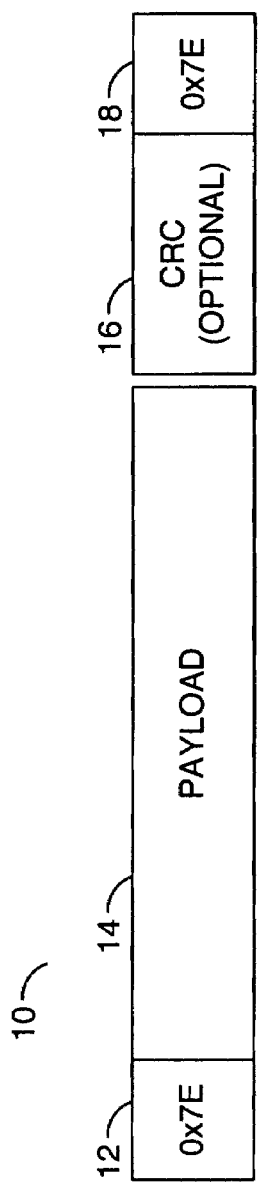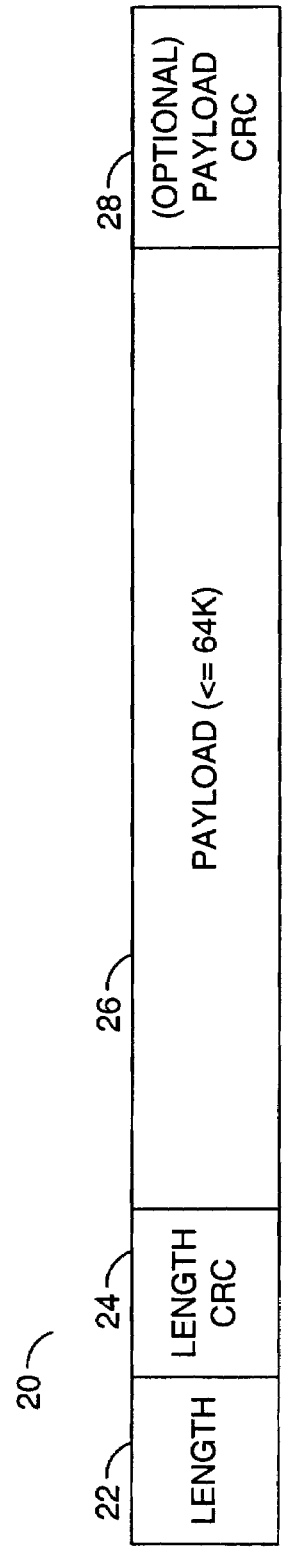

TECHNIQUE FOR PAYLOAD-INDEPENDENT FRAME DELINEATION ENGINE FOR OPTICAL DATA TRANSPORT

This application claims the benefit of U.S. Provisional Application No. 60/351,639, filed Oct. 29, 2001, which is hereby incorporated by reference in its entirety.

FIELD OF THE INVENTION

The present invention relates to a method and/or architecture for optical data transport generally and, more particularly, to a payload-independent frame delineation engine and associated protocol.

BACKGROUND OF THE INVENTION

Information is sent over conventional optical networks as a series of digital bytes. There are no analog values on the optical line to mark start or end of a frame. With a pure stream of bytes, it is not possible to tell where a particular frame starts and ends. Frame delineation is a method to mark the boundaries of a frame with special patterns or parameters so that a receiving device can separate frames within an incoming byte stream.

Conventional slow-speed wide area network (WAN) links and optical networks with Packet-over-SONET (POS) transports use a technique called High-Level Data Link Control (HDLC) to delineate frames. The HDLC method uses a unique byte value of 0x7E (hexadecimal) as a frame delimiter to mark the beginning and the end of each frame. Special coding is used inside each frame to make sure that any data pattern that matches the frame delimiter is converted to special codes to avoid false start/end indications.

Referring to FIG. 1, a drawing of a conventional HDLC encoded frame 10 is shown. Each frame 10 has a start-of-frame delimiter 12, a payload field 14, an optional cyclic redundancy check (CRC) field 16, and an end-of-frame delimiter 18. A difficulty with the HDLC approach is that there is an increased likelihood of losing the 0x7E frame delimiters 12 and 18 due to bit errors as link speeds increase. In addition to an error-prone delineation, the HDLC scheme also suffers from bandwidth inefficiency since many data byte patterns must be encoded into special two-byte sequences to avoid the 0x7E frame delimiter pattern and other control characters patterns. Therefore, the HDLC scheme requires transmitting more bytes than the actual payload. Depending on the number of conflicting bytes inside the payload, the amount of actual bandwidth needed to send a packet can be quite large.

To alleviate the limitations of HDLC, a method called Simple Data Link (SDL) was developed by Bell Labs. The SDL method does not use a predetermined pattern to delineate the start and the end of the frame. Instead, the SDL method only includes a header in each frame to delineate the start of frame. The end of frame is calculated from the start of frame delimiter and a check for an optional payload CRC field.

Referring to FIG. 2, a drawing of a conventional SDL encoded frame 20 is shown. In the SDL method, a 2-byte field 22 containing a length of the payload is used as a portion of the start-of-frame delimiter. A 2-byte length CRC field 24 that follows the length field 22 is used as a second portion of the start-of-frame delimiter. The length CRC field 24 containing a CRC value for the value stored in the length field 22. The length CRC field 24 is followed by a payload field 26 and an optional payload CRC field 28. The value stored in the length field 22 does not include the 4-byte payload CRC field 28.

A receiving engine for SDL delineation has hunting logic that tracks an incoming frame 20 on a byte-by-byte basis to look for a pattern where a CRC computed on first two bytes (length field 22) matches the following two bytes (length CRC field 24). If a match is found, then the receiving engine marks a valid start-of-frame. A number of bytes following the length CRC field 24 are returned to protocol processing entities as the payload. The number of bytes is equal to the value in the length field 22.

Once the payload is retrieved, the receiving engine receives the 4 subsequent bytes as a payload CRC value. The payload CRC value is used to verify integrity of the payload. After the payload CRC field 28 is received, the receiving engine starts hunting for a length/CRC validation to look for next frame boundary.

A problem with the SDL approach is that many protocols such as Ethernet, frame relay, and payloads for multiprotocol over Asynchronous Transfer Mode (ATM) have their own built-in CRC as part of the payload. Therefore, the SDL frame 20 does not have the additional 4-bytes of the payload CRC field 28. Conventional multi-service transport protocols require special logic for handling specific protocols as part of the frame delineation engine due to the optional payload CRC field 28. The special logic must understand the particular payload format being processed. Therefore, the special logic requires complicated delineation engines that need the complication of Open Systems Interconnect data link (i.e., layer 2) lookup and processing. Such a solution is complicated, expensive, and non-scalable. Each time a new protocol is added within the payload field 26, the logic must be changed to accommodate the new protocol.

For channelized SONET/SDH applications, it is almost impossible to use conventional technology for multi-service transport over different channels, due to the complexity and bulkiness of each engine. Since protocol requirements over a single channel change, each SDL engine must be able to accommodate all types of protocols. The receiving engine cannot be used to send payload data that does not have a header that clearly identifies presence or absence of the payload CRC field 28.

SUMMARY OF THE INVENTION

The present invention concerns a method for delineating a frame. The method generally comprises the steps of (A) receiving the frame comprising (i) a length value incorporating a payload error detection length, (ii) a length error detection value, (iii) a payload data, and (iv) a payload error detection value having the payload error detection length, wherein the payload error detection value and the payload data occupy separate fields of the frame, (B) performing an error detection on the length value based upon the length error detection value, and (C) retrieving the payload data and the payload error detection value based upon the length value in response to passing the error detection on the length value.

The objects, features and advantages of the present invention include providing an optical data transport engine and protocol that may provide for (i) payload-independent frame delineation, (ii) payload independent frame construction, (iii) scalability, (iv) simple and efficient operation, and/or (v) cost effectiveness.

BRIEF DESCRIPTION OF THE DRAWINGS

These and other objects, features and advantages of the present invention will be apparent from the following detailed description and the appended claims and drawings in which:

FIG. 1 is a drawing of a conventional HDLC encoded frame;

FIG. 2 is a drawing of a conventional SDL encoded frame;

DETAILED DESCRIPTION OF THE PREFERRED EMBODIMENTS

Figure 3:
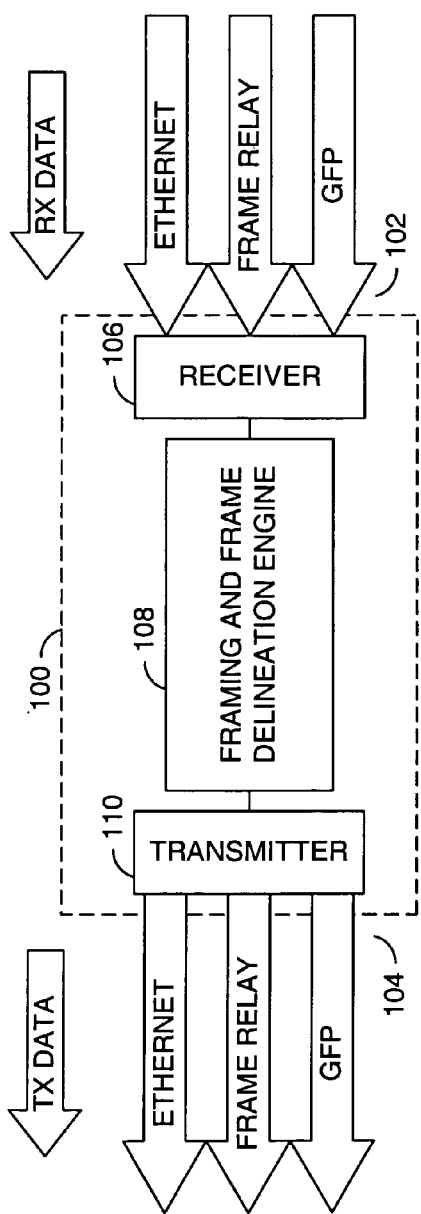
FIG. 3 is a block diagram of an optical data transport engine.

Referring to FIG. 3, a block diagram of an apparatus 100 is shown in accordance with a preferred embodiment of the present invention. The apparatus 100 may be implemented as an optical data transport engine. An interface 102 may be provided in the optical data transport engine 100 to receive a signal (e.g., RX_DATA). An interface 104 may be provided in the optical data transport engine 100 to present a signal (e.g., TX_DATA).

The signal RX_DATA may be implemented as an incoming data stream having one or more frames of a protocol. The signal TX_DATA may be implemented as an outgoing data stream having one or more frames of the protocol. The protocol may be generally defined by the "PPP over Simple Data Link (SDL) using SONET/SDH with ATM-like framing" (Internet Engineering Task Force (IETF), Reston Va., RFC 2823) hereby incorporated by reference in its entirety. The SDL protocol may be modified from the RFC 2823 by the present invention. The modification is generally defined in "Payload-independent Delineation for Simple Data Link (SDL) Framing" (Cypress Semiconductor, San Jose, Calif.) hereby incorporated by reference in its entirety.

An Open Systems Interconnection (OSI) model physical layer may define the signals RX_DATA and TX_DATA as optical signals. The signals RX_DATA and TX_DATA may be implemented as other types of signals as required to match a particular physical layer application. For example, the signals RX_DATA and TX_DATA may be implemented as electrical signals carried by wires, radio-frequency signals transmitted through the air, and the like.

The optical data transport engine 100 generally comprises a circuit 106, a circuit 108, and a circuit 110. The circuit 106 may connect to the interface 102 to receive the signal RX_DATA. The circuit 110 may connect to the interface 104 to present the signal TX_DATA.

The circuit 106 may be implemented as a receiver circuit. The receiver circuit 106 may convert the signal RX_DATA from an optical signal to an electrical signal for processing by the circuit 108. The receiver circuit 106 may perform equalization, amplification, clock recovery, demodulation, and/or other operations related to converting the signal RX_DATA from an optical domain to an electrical domain.

The circuit 108 may be implemented as a framing and frame delineation engine. The framing and frame delineation engine 108 generally performs (i) a frame delineation operation on the converted signal RX_DATA and (ii) a framing operation that ultimately produces the signal TX_DATA. A particular implementation of the framing and frame delineation engine 108 may include one or both of the operations. Related U.S. patent application Ser. No. 09/881,493 filed on Jun. 14, 2001, hereby incorporated by reference in its entirety, generally provides another example implementation for processing the frames.

The circuit 110 may be implemented as a transmitter circuit. The transmitter circuit 110 may convert an electrical signal presented by the framing and frame delineation engine 108 into an optical signal that is the signal TX_DATA. The transmitter circuit 110 may perform source coding, channel coding, and/or other operations related to converting the signal TX_DATA from the electrical domain to the optical domain.

The framing and frame delineation engine 108 may be intended as a payload-independent hardware engine for use primarily with optical networks. The frame delineation operation of the present invention generally involves a technique where the length field 22 (FIG. 2) includes a length of the payload field 26 and a length (e.g., 4-bytes) of the payload CRC field 28, if present. Therefore, the framing and frame delineation engine 108 may be protocol-independent, small, efficient, and cost-effective.

With Simple Data Link (SDL)-style framing gaining popularity in high-speed optical networking and standardization by the International Telecommunications Union (ITU), the American National Standards Institute (ANSI), and the Internet Engineering Task Force (IETF), the above-mentioned technique may be very useful in optical transport device designs. By changing the definition of the length field 22 to point to an end of the frame 20 instead of an end of the payload field 26, the framing and frame delineation engine 108 may not require any additional logic to process individual protocols encapsulated by the payload field 26 and the payload CRC field 28. The encapsulated protocol may include, but is not limited to, an Ethernet (IEEE 802.3) protocol, a frame relay transport protocol, and a Generic Framing Procedure (ANSI Draft).

Figure 4:
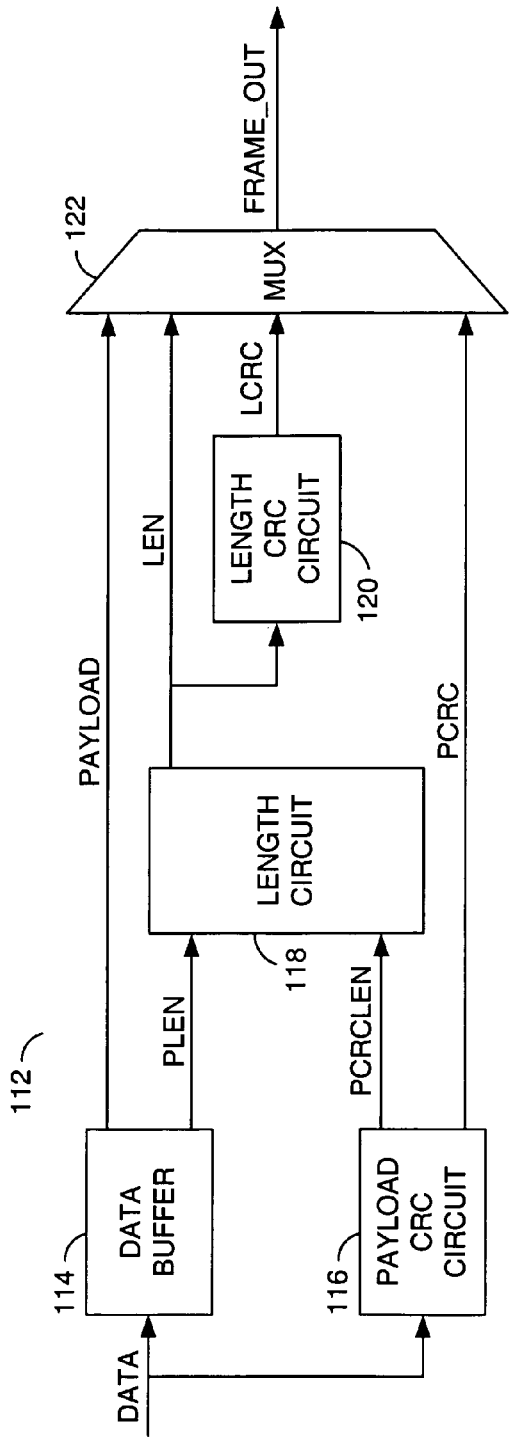
FIG. 4 is a block diagram of an example circuit implementing framing.

Referring to FIG. 4, a block diagram of an example circuit 112 implementing the framing operation is shown. The circuit 112 may be integrated into the framing and frame delineation engine 108. The circuit 112 generally comprises a circuit 114, a circuit 116, a circuit 118, a circuit 120, and a circuit 122.

The circuits 114 and 116 may receive a signal (e.g., DATA). The circuit 114 may present a signal (e.g., PAYLOAD) to the circuit 122. The circuit 114 may present another signal (e.g., PLEN) to the circuit 118. The circuit 116 may present a signal (e.g., PCRCLEN) to the circuit 118. The circuit 116 may also present another signal (e.g., PCRC) to the circuit 122. The circuit 118 may present a signal (e.g., LEN) to the circuit 120 and the circuit 122. The circuit 120 may present a signal (e.g., LCRC) to the circuit 122. The circuit 122 may present a signal (e.g., FRAME_OUT).

The signal DATA may be implemented as a data stream of customer data. The signal PAYLOAD may be implemented as a buffered presentation of the signal DATA. The signal PLEN may be implemented as a payload length value for the signal PAYLOAD. The signal PCRC may be implemented as a CRC value or other error detection value calculated from the signal PAYLOAD. The signal PCRCLEN may be implemented as a payload CRC length value for the signal PCRC. The signal LEN may be implemented as a length value that is a sum of the payload length value and the payload CRC length value. The signal LCRC may be a CRC value or other error detection value calculated for the signal LEN. The signal FRAME_OUT may be implemented as a modified version of the frame 20 (e.g., having a modified definition of the length value incorporating the payload CRC length value).

The circuit 114 may be implemented as a data buffer circuit. The data buffer circuit 114 may be configured to store a frame worth of the customer data in the signal DATA. The circuit 114 may present the customer data as the signal PAYLOAD after the entire frame has been buffered. The data buffer circuit 114 may determine the payload length value from the signal PAYLOAD. The payload length value may be expressed in terms of a number of bytes. The data buffer circuit 114 may present the payload length value as the signal PLEN.

The circuit 116 may be implemented as a payload CRC circuit. The payload CRC circuit 116 may be configured to generate the payload CRC value based upon the signal DATA. The calculation of the payload CRC value may take place in parallel to the buffering of the signal DATA. The payload CRC circuit 116 may present the payload CRC value as the signal PCRC. The payload CRC circuit 116 may also determine the payload CRC length value for the signal PCRC. The payload CRC length value may be expressed in terms of a number of bytes. The payload CRC length value may be presented as the signal PCRCLEN.

The circuit 118 may be implemented as a length circuit. The length circuit 118 may be configured to calculate the length value destined for the length field 22 of the modified frame 20. The length circuit 118 may calculate the length value by summing the payload length value within the signal PLEN and the payload CRC length value within the signal PCRCLEN. The length value may be expressed in terms of a number of bytes. The length circuit 118 may present the length value as the signal LEN.

The circuit 120 may be implemented as a length CRC circuit. The length CRC circuit 120 may be configured to calculate the length CRC value for the signal LEN. The length CRC value may be expressed in terms of a number of bytes. The length CRC circuit 120 may present the length CRC value as the signal LCRC.

The circuit 122 may be implemented as a multiplexer circuit. The multiplexer circuit 122 may be configured to multiplex the signals PAYLOAD, LEN, LCRC and PCRC to present the signal FRAME_OUT. The multiplexer circuit 122 may multiplex in an order of (i) the signal LEN, (ii) the signal LCRC, (iii) the signal PAYLOAD, and (iv) the signal PCRC.

The modified frame 20 may be implemented without the payload CRC field 28. Where the payload CRC field 28 is not required, the payload CRC circuit 116 may set the signal PCRCLEN to a zero value and set the signal PCRC to a null value. Furthermore, the multiplexer 122 may skip multiplexing the signal PCRC into the signal FRAME_OUT. Therefore, the signal LEN may be set to the length of just the payload.

Figure 5:
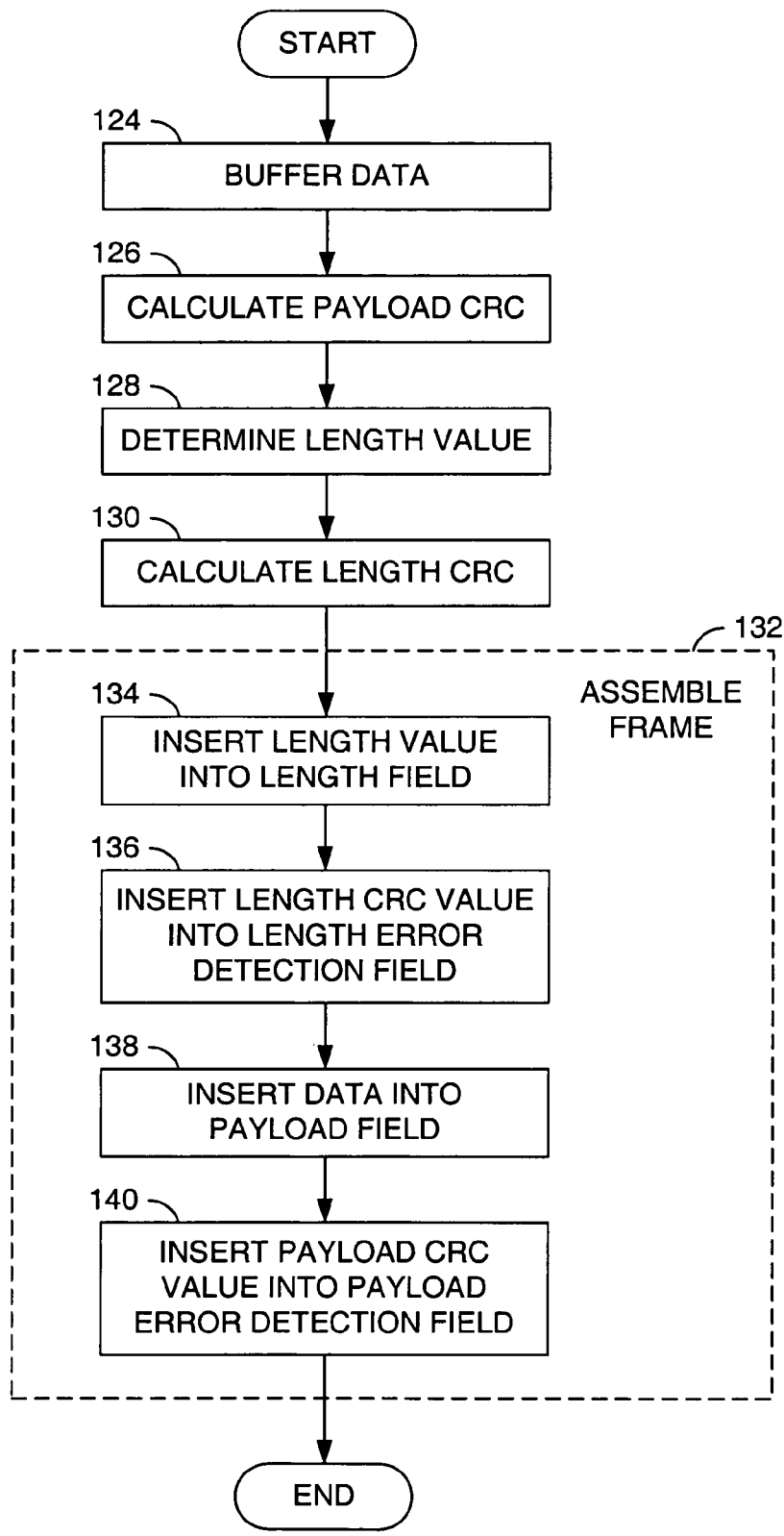
FIG. 5 is a flow diagram of a method for framing.

Referring to FIG. 5, a flow diagram for a framing operation of the circuit 112 is shown. The framing operation may begin with the buffering of the signal DATA (e.g., block 124) by the data buffer circuit 114. The circuit 116 may calculate the payload CRC value (e.g., block 126). The payload CRC value calculation may be performed simultaneously with the buffering operation. Once all of the data has been buffered and the payload CRC value calculated, the length circuit 118 may determine the length value from the signal PLEN and the signal PCRCLEN (e.g., block 128). The length circuit 120 may then calculate the length CRC value from the signal LEN (e.g., block 130).

The multiplexer circuit 122 may assemble the signal FRAME_OUT (e.g., block 132). Frame assembly may begin by multiplexing the signal LEN to the signal FRAME_OUT (e.g., block 134). The signal LCRC may then by multiplexed to the signal FRAME_OUT (e.g., block 136). The signal PAYLOAD may then be multiplexed to the signal FRAME_OUT (e.g., block 138). Finally, the signal PCRC may be multiplexed to the signal FRAME_OUT (e.g., block 140). The resulting signal FRAME_OUT may be presented to the transmitter circuit 110 for transmission as the signal TX_DATA.

Figure 6:
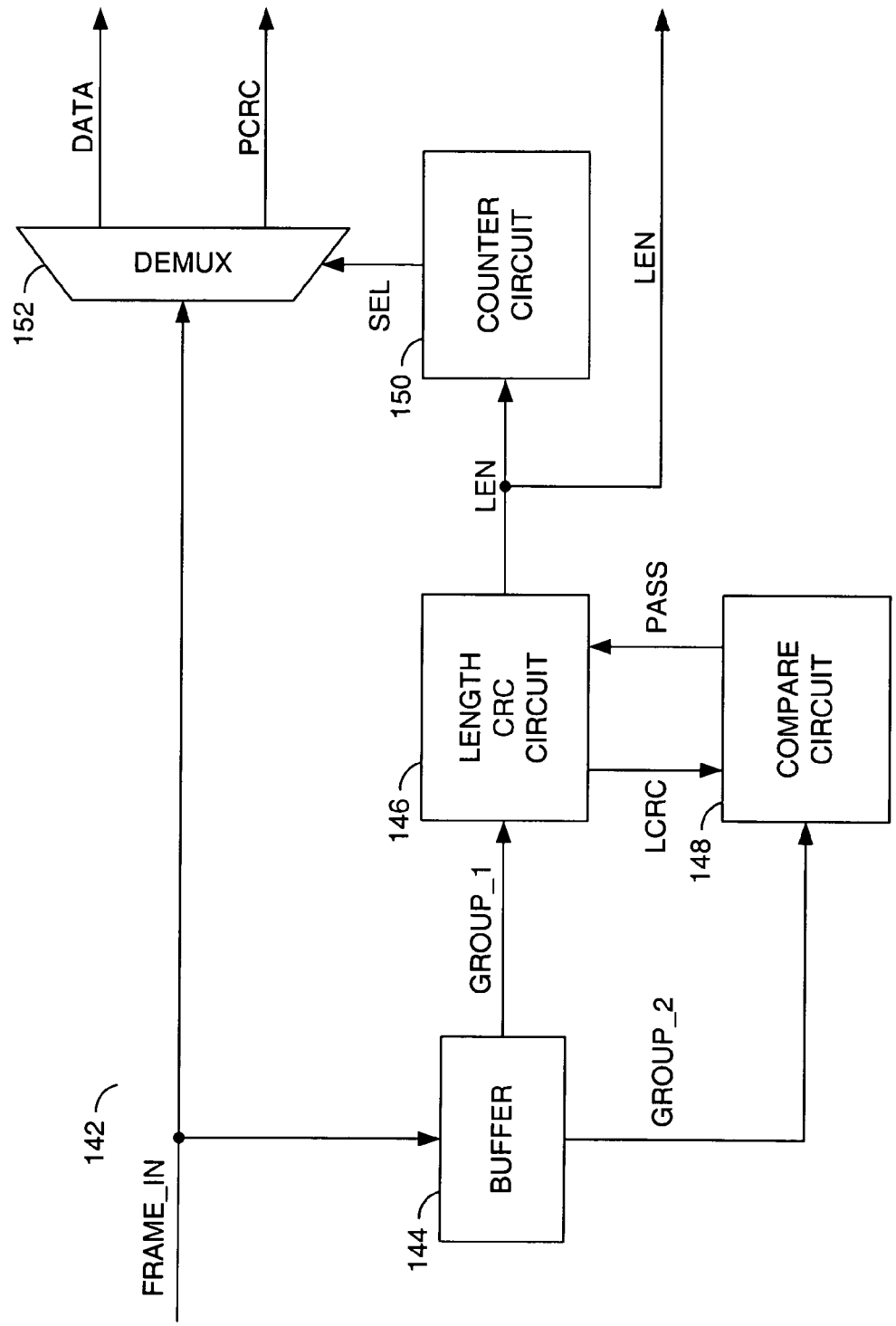
FIG. 6 is a block diagram of an example circuit implementing frame delineation.

Referring to FIG. 6, a block diagram of an example circuit 142 implementing the frame delineation operation is shown. The circuit 142 may be integrated into the framing and frame delineation engine 108. The circuit 142 generally comprises a circuit 144, a circuit 146, a circuit 148, a circuit 150, and a circuit 152. The circuits 144 and 152 may receive a signal (e.g., FRAME_IN). The circuit 144 may present a signal (e.g., GROUP_1) to the circuit 146. The circuit 144 may also present a signal (e.g., GROUP_2) to the circuit 148. The circuit 146 may present the signal LCRC to the circuit 148. The circuit 146 may also present the signal LEN to the circuit 150. The circuit 148 may present a signal (e.g., PASS) to the circuit 146 and external to the circuit 142. The circuit 150 may present a signal (e.g., SEL) to the circuit 152. The circuit 152 may present the signal DATA. The circuit 152 may also present the signal PCRC.

The signal FRAME_IN may be implemented as a modified frame 20 received by the receiver circuit 106. The signal FRAME_IN may be an electrical domain version of the signal RX_DATA. The signal GROUP_1 may be implemented as a predetermined number of bytes sampled from the signal FRAME_IN. The signal GROUP_2 may be implemented as another predetermined number of bytes sampled from the signal FRAME_IN. The signal PASS may be implemented as a pass/fail indicator. The signal SEL may operate as a demultiplex selection signal.

The circuit 144 may be implemented as a buffer circuit. The buffer circuit 144 may be configured to buffer several bytes of data from the signal FPAME_IN. The buffer circuit 144 may buffer the several bytes of data in a first-in-first-out operation.

A predetermined number of oldest bytes (e.g., 2 bytes) buffered from the signal FRAME_IN may be presented as the signal GROUP_1. Another predetermined number of bytes (e.g., 2 bytes) immediately following the predetermined number of oldest bytes may be presented as the signal GROUP_2. The signals GROUP_1 and GROUP_2 may be used by the circuit 146 and the circuit 148 to search for the length field 22 and the length CRC field 24 of the modified frame 20.

The circuit 146 may be implemented as another length CRC circuit. The length CRC circuit 146 may be configured to calculate the length CRC value from the bytes presented in the signal GROUP_1. The length CRC circuit 146 may also buffer the bytes presented in the signal GROUP_1 internally.

The circuit 148 may be implemented as a compare circuit. The compare circuit 148 may be configured to compare the signal LCRC with the signal GROUP_2. The compare circuit 148 may assert the signal PASS when the signals LCRC and GROUP_2 match to mark a start of the modified frame 20. The compare circuit 148 may de-assert the signal PASS when the signals LCRC and the GROUP_2 do not match. The length CRC circuit 146 may present the buffered signal GROUP_1 as the signal LEN in response to the signal PASS being asserted. The length CRC circuit 146 may not present the signal LEN in response to the signal PASS being de-asserted.

The circuit 152 may be implemented as a demultiplexer circuit. The demultiplexer circuit 150 may demultiplex or block the signal FRAME_IN as determined by the signal SEL. While demultiplexing, the signal FRAME_IN may be presented as the signal DATA or the signal PCRC as selected by the signal SEL. While blocking, the signal FRAME_IN may not be presented at a used output of the demultiplexer circuit 152.

The circuit 150 may be implemented as a counter circuit. The counter circuit 150 may use the signal LEN to count bytes within the signal FRAME_IN. When the counter circuit 150 receives the signal LEN from the length CRC circuit 146, the counter circuit 150 may present the signal SEL with a value that may cause the demultiplexer circuit 152 to route the signal FRAME_IN to the signal DATA. As each byte of the signal FRAME_IN is demultiplexed, the counter circuit 150 may count down to a predetermined value equal to the length of the payload CRC (e.g., 4 bytes if the payload CRC is present and zero bytes if the payload CRC is absent). When the counter circuit 150 reaches the predetermined value, the value of the signal SEL may be changed to cause the demultiplexer circuit 152 to route the signal FRAME_IN to the signal PCRC, if present. The counter circuit 150 may continue counting bytes of the signal FRAME_OUT until the count value reaches zero. Thereafter, the counter circuit 150 may present a value in the signal SEL that may cause the demultiplexer circuit 152 to block the signal FRAME_OUT.

Figure 7:
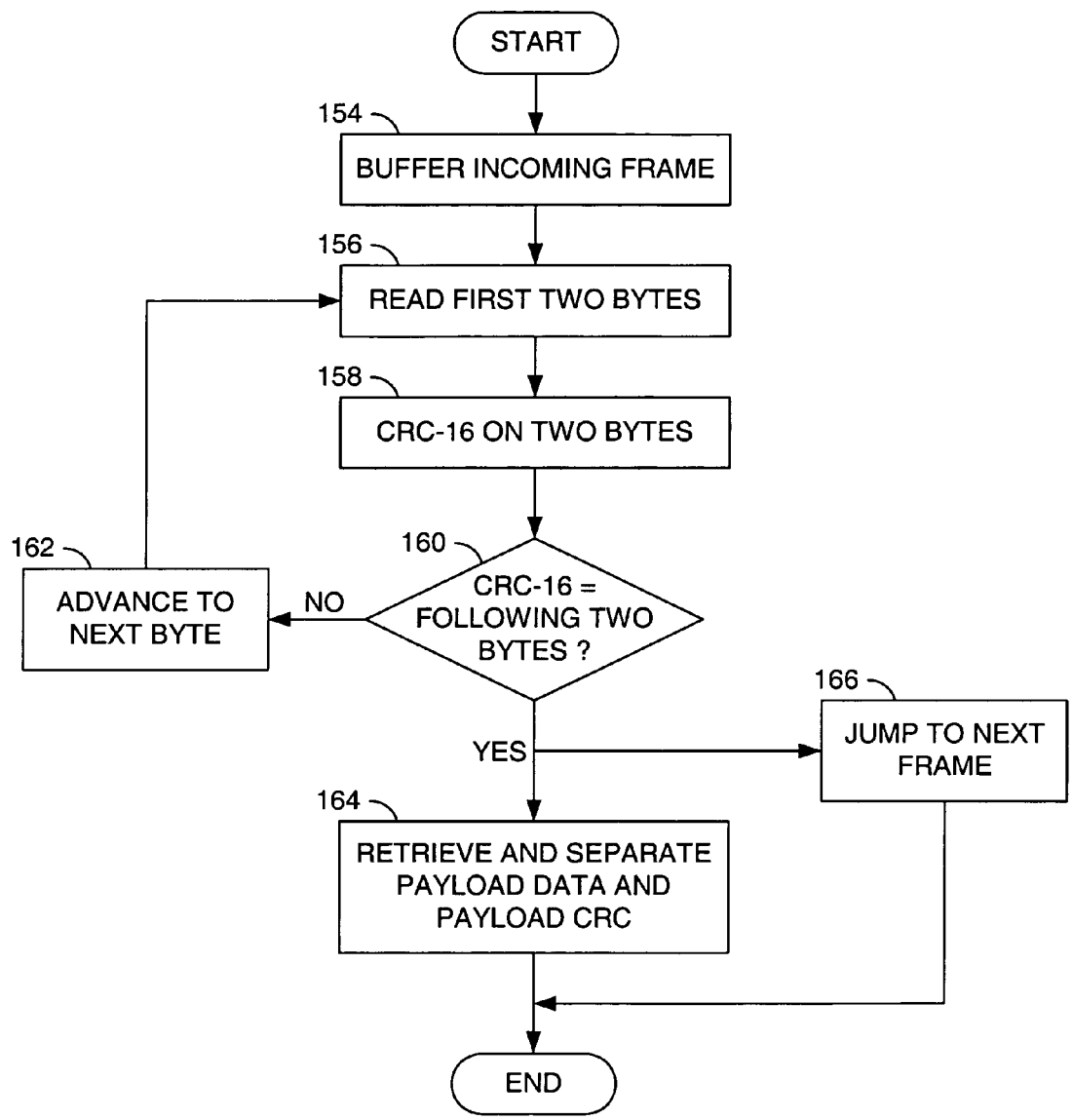
FIG. 7 is a flow diagram of a method for frame delineation.

Referring to FIG. 7, a flow diagram for a frame delineation operation of the circuit 142 is shown. The frame delineation operation generally (i) receives the length field 22, (ii) validates the length field 22 with length CRC field 24, (iii) delineates the payload field 26 and payload CRC field 28 based upon the value given in the length field 22, and then (iv) begins searching for the next frame. The frame delineation operation may begin by buffering a portion of the signal FRAME_IN (e.g., block 154) in the buffer circuit 144. Two bytes from the buffer circuit 144 may be presented as the signal GROUP_1 (e.g., block 156). The length CRC circuit 146 may generate a CRC value for the two bytes read from the signal GROUP_1 (e.g., block 158). The compare circuit 148 may then compare the CRC value for the two bytes against the next two bytes presented by the buffer circuit 144 as the signal GROUP_2 (e.g., decision block 160).

If the CRC value of the first two bytes does not match the value of the second two bytes (e.g., the NO branch of decision block 160), then the buffer circuit 144 may advance the buffered data by a byte sampled from the signal FRAME_IN (e.g., block 162). The process then generally iterates at reading the two oldest bytes as the signal GROUP_1 (e.g., block 156). The iterations may continue through consecutive bytes of the signal FRAME_IN until the CRC value calculated from the signal GROUP_1 matches the value from the signal GROUP_2 (e.g., the YES branch of decision block 160) thus marking a start to the modified frame 20. The demultiplexer circuit 152 may then retrieve and separate the payload data and the payload CRC value from the signal FRAME_IN under the control of the counter circuit 150 (e.g., block 164). In one embodiment, the process may use the length value captured and presented by the length CRC circuit 146 to jump ahead the length value number of bytes in the signal FRAME_IN to being searching for a next frame (e.g., block 166).

Figure 8:
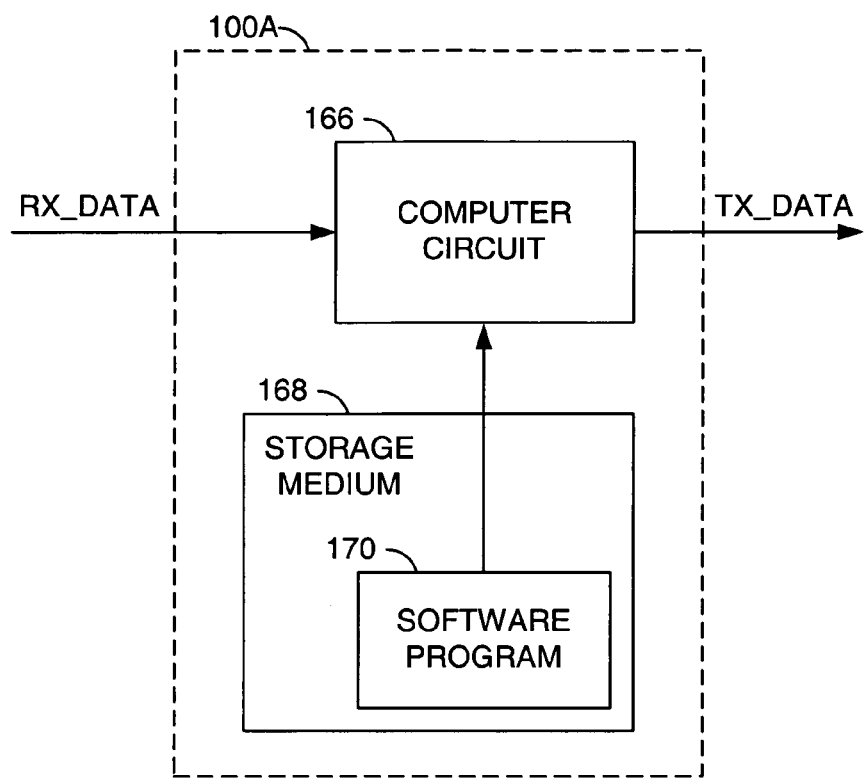
FIG. 8 is a block diagram of another embodiment of the optical data transport engine.

Referring to FIG. 8, a block diagram of another example apparatus 100A implementing the optical data transport engine is shown. At sufficiently low data rates for the signals RX_DATA and TX_DATA, the frame delineation operation and the framing operation may be implemented under software control. Therefore, the optical data transport engine 100A may comprise a computer circuit 166 and a storage medium 168. The storage medium 168 may store a software program 170 that is readable and executable by the computer circuit 166. The software program 170 may contain instructions implementing the frame delineation operation and/or the framing operation.

The function performed by the flow diagrams of FIGS. 5 and 7 may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. A method for delineating a frame, comprising the steps of:
  (A) receiving said frame comprising (i) a length field storing a length value for a combined length consisting of a payload field and a payload error detection field, (ii) a length error detection field storing a length error detection value for said length value, (iii) said payload field storing a payload data and (iv) said payload error detection field storing a payload error detection data for said payload data;
  (B) performing an error detection on said length value based upon said length error detection value; and
  (C) retrieving said payload data and said payload error detection data from said frame based upon said length value and in response to passing said error detection on said length value, wherein said retrieving step comprises the sub-steps of:
    (i) generating by counting bytes in the frame a select signal based upon both said length value and a predetermined value; and (ii) generating by multiplexing (i) a first signal carrying said payload data and (i) a second signal carrying said payload error detection data based on said select signal.

2. The method according to claim 1, wherein step (B) comprises the sub-steps of:
- buffering a plurality of received bytes in a buffer;
- calculating an intermediate error detection value from a first predetermined group of said received bytes in said buffer;
- comparing said intermediate error detection value with a received value defined by a second predetermined group of said received bytes in said buffer; and
- marking a start of said payload field in response to said intermediate error detection value matching said received value.

3. The method according to claim 2, further comprising the steps of:
- advancing said buffer such that at least one of said received bytes moves from said second predetermined group into said first predetermined group; and
- buffering at least one subsequent byte of said received bytes into said second predetermined group in response to said intermediate error detection value being different than said received value.

4. The method according to claim 2, further comprising the step of generating a length signal conveying said length value from said first predetermined group in response to said intermediate error detection value matching said received value.

5. The method according to claim 4, further comprising the step of separating said payload data from said payload error detection data based upon both said length value and said predetermined value.

6. The method according to claim 1, further comprising the step of jumping a number of bytes equal to said length value from a start of said payload field to reach a next frame.

7. The method according to claim 1, further comprising the steps of:
- determining a second length value based upon (i) a payload length of said payload data and (ii) a second payload error detection length of a second payload error detection value;
- calculating a second length error detection value for said second length value; and
- inserting (i) said second length value, (ii) said second length error detection value, (iii) said payload data, and (iv) said second payload error detection value into a second frame, wherein said payload data and said second payload error detection value occupy separate fields of said second frame.

8. The method according to claim 1, wherein said steps (A) through (C) are stored in a storage medium as a computer program that is readable and executable by a computer to delineate said frame.

9. An apparatus for delineating a frame, comprising:
- means for receiving said frame comprising (i) a length field storing a length value for a combined length consisting of a payload field and a payload error detection field, (ii) a length error detection field storing a length error detection value for said length value, (iii) said payload field storing a payload data, and (iv) a payload error detection field storing a payload error detection data for said payload data;
- means for performing an error detection on said length value based upon said length error detection value; and
- means for retrieving said payload data and said payload error detection data from said frame based upon said length value in response to passing said error detection on said length value, wherein said means for retrieving comprises:
- a counter configured to generate a select signal based upon both said length value and a predetermined value; and
- a demultiplexer configured to generate (i) a first signal carrying said payload data and (i) a second signal carrying said payload error detection data based on said select signal.

10. The apparatus according to claim 9, wherein said means for performing said error detection comprises a buffer circuit configured to buffer a plurality of received bytes transferring said frame.

11. The apparatus according to claim 10, wherein said means for performing said error detection further comprises a length circuit configured to generate an intermediate error detection value from a first predetermined group of said received bytes in said buffer circuit.

12. The apparatus according to claim 11, wherein said means for performing said error detection further comprises a compare circuit configured to generate a pass signal by comparing said intermediate error detection value to a received value defined by a second group of said received bytes in said buffer circuit.

13. The apparatus according to claim 12, wherein said length circuit is further configured to generate a length signal conveying said length value to said counter in response to said intermediate error detection value matching said received value.

* * * * *